(12) United States Patent
Blake

(10) Patent No.: US 12,546,450 B1
(45) Date of Patent: Feb. 10, 2026

(54) BIG RIG LIGHT

(71) Applicant: Kerry Blake, Wichita Falls, TX (US)

(72) Inventor: Kerry Blake, Wichita Falls, TX (US)

( * ) Notice: Subject to any disclaimer, the term of this patent is extended or adjusted under 35 U.S.C. 154(b) by 0 days.

(21) Appl. No.: 19/079,417

(22) Filed: Mar. 13, 2025

(51) Int. Cl.
| | |
|---|---|
| *F21S 41/151* | (2018.01) |
| *F21S 41/143* | (2018.01) |
| *F21S 43/14* | (2018.01) |
| *F21S 43/15* | (2018.01) |
| *F21V 21/08* | (2006.01) |
| *F21V 23/00* | (2015.01) |
| *F21W 105/00* | (2018.01) |
| *F21W 107/10* | (2018.01) |
| *F21Y 103/10* | (2016.01) |
| *F21Y 115/10* | (2016.01) |

(52) U.S. Cl.
CPC ........... *F21S 41/151* (2018.01); *F21S 41/143* (2018.01); *F21S 43/14* (2018.01); *F21S 43/15* (2018.01); *F21V 21/08* (2013.01); *F21V 23/001* (2013.01); *F21W 2105/00* (2018.01); *F21W 2107/10* (2018.01); *F21Y 2103/10* (2016.08); *F21Y 2115/10* (2016.08)

(58) Field of Classification Search
CPC ........ F21S 41/151; F21S 41/143; F21S 43/14; F21S 43/15
See application file for complete search history.

(56) References Cited

U.S. PATENT DOCUMENTS

| | | | |
|---|---|---|---|
| 4,857,807 A | 8/1989 | Hargis | |
| 5,678,505 A | 10/1997 | Leung et al. | |
| 10,309,592 B2 | 6/2019 | Roach et al. | |
| 10,351,053 B1 | 7/2019 | Salinas | |
| 11,180,073 B2 * | 11/2021 | Madril | B60K 37/00 |
| 11,300,266 B1 * | 4/2022 | Singh | F21S 43/195 |
| 2007/0120397 A1 | 5/2007 | Layfield et al. | |
| 2010/0202150 A1 * | 8/2010 | Adams | B60Q 1/2607 |
| | | | 362/485 |
| 2011/0219651 A1 * | 9/2011 | Borreggine | G09F 9/33 |
| | | | 296/180.1 |

(Continued)

FOREIGN PATENT DOCUMENTS

DE 102005043501 A1 * 3/2007 ........... B60Q 1/0491

OTHER PUBLICATIONS

Machine Translation (Year: 2025).*

(Continued)

*Primary Examiner* — Christopher E Dunay
(74) *Attorney, Agent, or Firm* — Cramer Patent & Design, PLLC.; Aaron R. Cramer

(57) ABSTRACT

A big rig light configured to improve visibility and safety for trucks, comprising a fairing panel light mounted to a rear edge of a fairing panel on a truck cab. The device includes a housing with a mounting plate, internal lens supports, and a plurality of light sources. The internal lens supports define multiple light segments, including a top light segment, a center light segment, and a bottom light segment. The light sources are independently controlled via a wiring harness electrically coupled to the truck's system. A lens covers the light sources, and the segments are configured to perform functions such as taillight, turn signal, brake light, and backup light. The device enhances safety by improving illumination and signaling visibility during various driving operations.

13 Claims, 3 Drawing Sheets

(56) References Cited

U.S. PATENT DOCUMENTS

| | | | |
|---|---|---|---|
| 2014/0265438 A1 | 9/2014 | Kronemeyer | |
| 2014/0268858 A1* | 9/2014 | Norris | B60Q 1/30 |
| | | | 362/545 |
| 2016/0067597 A1* | 3/2016 | Hamilton | B60Q 1/5035 |
| | | | 463/6 |
| 2021/0372587 A1* | 12/2021 | Sassoon | F21S 43/50 |
| 2025/0327555 A1* | 10/2025 | Massa | F21S 43/30 |

OTHER PUBLICATIONS

Tow-Rax Recessed LED Light. Product Listing [online]. copyright etrailer.com [retrieved on Mar. 29, 2024]. Retrieved from the Internet: <URL: https://www.etrailer.com/Work-Lights/Tow~Rax/TWSPRLB2L.html?feed=npn&utm_id=361663294&msclkid=0485a927900f1b2481dbcf21431bf272&utm_source=bing&utm_medium=cpc&utm_campaign=Bing%20%7C%20Shop%20-%20Work%20Lights&utm_term=4577610508369047&utm_content=30%20-%2060>.

* cited by examiner

BIG RIG LIGHT

RELATED APPLICATIONS

None

FIELD OF THE INVENTION

The present invention relates generally to vehicle lighting systems, and more specifically to an improved light assembly for use on big rig trucks that enhances visibility and safety by providing multi-segment lighting for signaling and illumination purposes.

BACKGROUND OF THE INVENTION

Conventional lighting systems on big rig trucks often lack the versatility and functionality needed to ensure optimal visibility during various driving conditions, such as turning, backing, or stopping. Standard lights may fail to provide adequate illumination or signaling capabilities, leading to increased risks of accidents and reduced awareness of the vehicle's movements. Additionally, existing systems may not integrate seamlessly with the truck's design, compromising the aesthetic appearance. Therefore, there is a need for an advanced lighting system that can be easily integrated onto a truck, offers independent control of lighting segments, and performs multiple functions, including taillight, turn signal, brake light, and backup light, all while maintaining a factory-fitted appearance.

SUMMARY OF THE INVENTION

Embodiments of the present disclosure may include a big rig light for a truck, including a fairing panel light configured to be coupled to a rear edge of a fairing panel on a cab of the truck. Embodiments may also include a housing including a mounting plate configured to be secured adjacent to the rear edge of the fairing panel using mounting hardware.

Embodiments may also include plurality of internal lens supports including a top end plate projecting perpendicularly from a top portion of. In some embodiments, the mounting plate. Embodiments may also include a bottom end plate projecting perpendicularly from a bottom. Embodiments may also include portion of the mounting plate.

Embodiments may also include an upper divider projecting perpendicularly from the mounting. Embodiments may also include plate between the top end plate and the bottom end plate. Embodiments may also include a lower divider projecting perpendicularly from the mounting. Embodiments may also include plate between the upper divider and the bottom end plate.

Embodiments may also include a plurality of light sources coupled to the mounting plate. In some embodiments, the plurality. Embodiments may also include of light sources may be configured to provide illumination. Embodiments may also include a lens configured to cover the housing and the plurality of light sources. Embodiments may also include a wiring harness electrically coupled to the plurality of light sources and. Embodiments may also include configured to connect to the truck's electrical system to control illumination of the plurality of light sources.

In some embodiments, the housing defines a plurality of light segments, including a top light segment defined by the top end plate and the upper divider. Embodiments may also include a center light segment defined by the upper divider and the lower divider. Embodiments may also include a bottom light segment defined by the lower divider and the bottom end plate.

Embodiments may also include each of the plurality of light segments includes a portion of the plurality of light sources configured to be independently illuminated. In some embodiments, the lens may include a single contiguous lens covering all of the plurality of light segments. Embodiments may also include a plurality of lens segments, each of the plurality of lens segments configured. Embodiments may also include to cover an individual light segment.

In some embodiments, the mounting hardware may include at least one of screws, bolts, nuts, washers, rivets, clips, or hooks. In some embodiments, the plurality of light sources may be light-emitting diodes (LEDs). In some embodiments, the plurality of light sources may be configured to provide a taillight function by emitting red light at a first intensity. Embodiments may also include a turn signal function by emitting red light at a second intensity, the second. Embodiments may also include intensity being greater than the first intensity. Embodiments may also include a brake light function by emitting continuous red light at the second intensity. Embodiments may also include and. Embodiments may also include a backup light function by emitting white light at the second intensity.

In some embodiments, the plurality of light sources may be activated by controls located within the cab of the truck. In some embodiments, the fairing panel light may be configured to be mounted on at least one of a left fairing panel of the cab. Embodiments may also include a right fairing panel of the cab. In some embodiments, the fairing panel light may be symmetrical and may be inverted to fit either the left fairing panel or the right fairing panel.

In some embodiments, the fairing panel improves the aerodynamics of the truck by streamlining equipment and preventing direct air impact on rear tires of the cab. In some embodiments, the wiring harness may be configured to transmit power and control signals to the plurality of light sources. In some embodiments, the housing may be configured to provide a factory-fitted appearance when installed on the truck.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
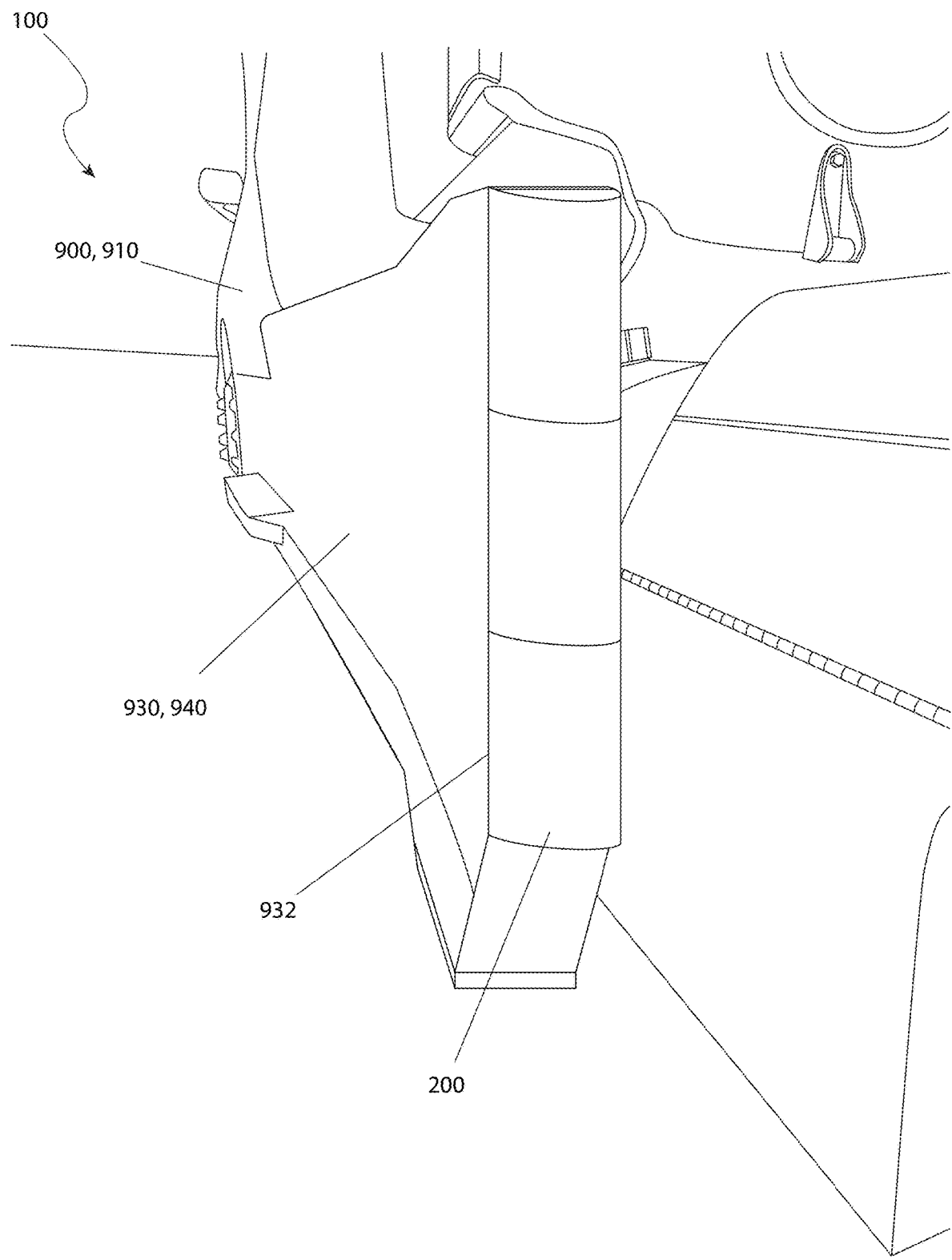
FIG. 1 is an in-use view of a big rig light 100, according to an embodiment of the present invention.
Figure 2:
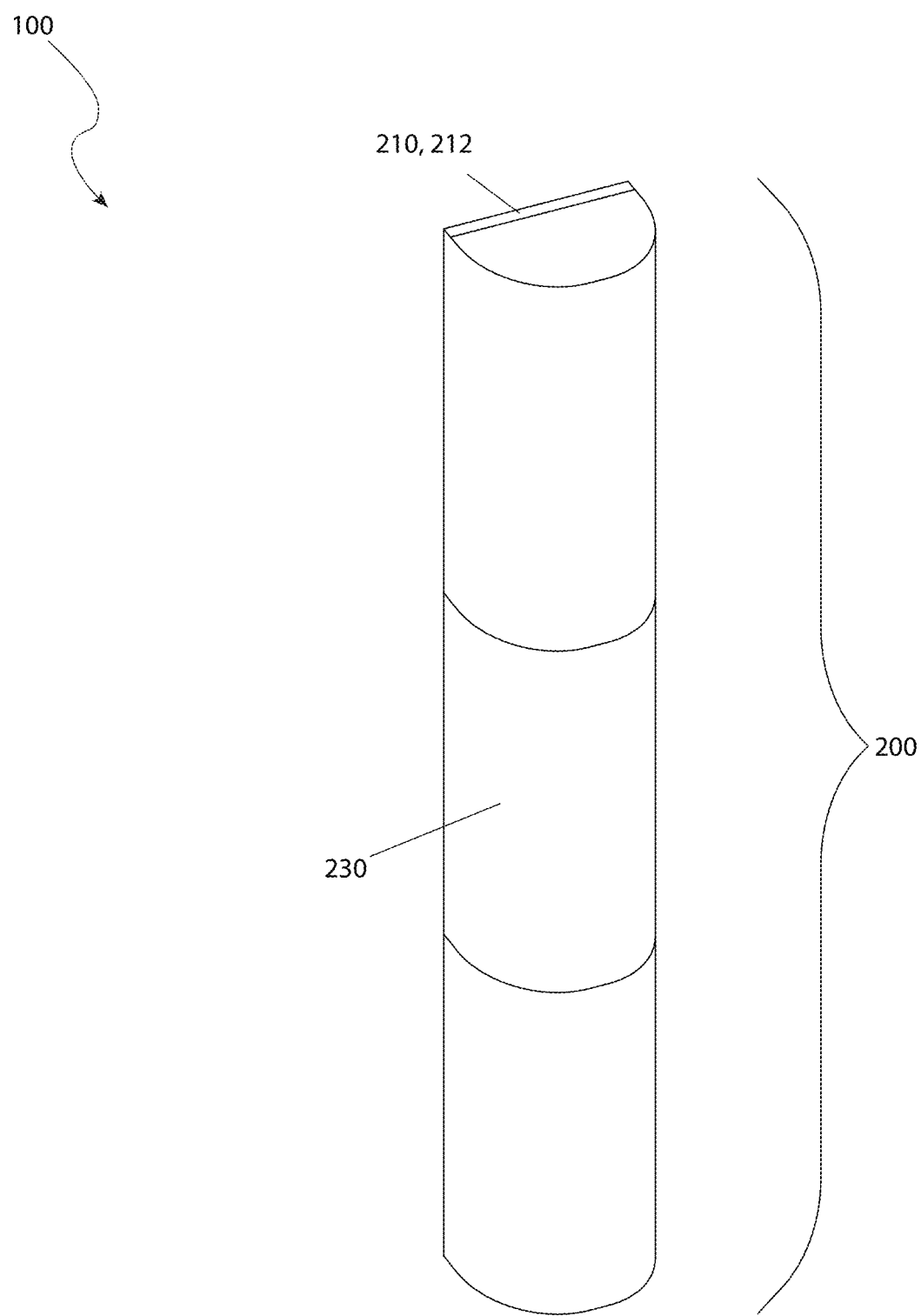
FIG. 2 is an isometric view of a big rig light 100, according to an embodiment of the present invention; and, FIG. 3 is an exploded view of a big rig light 100, according to an embodiment of the present invention.
Figure 3:
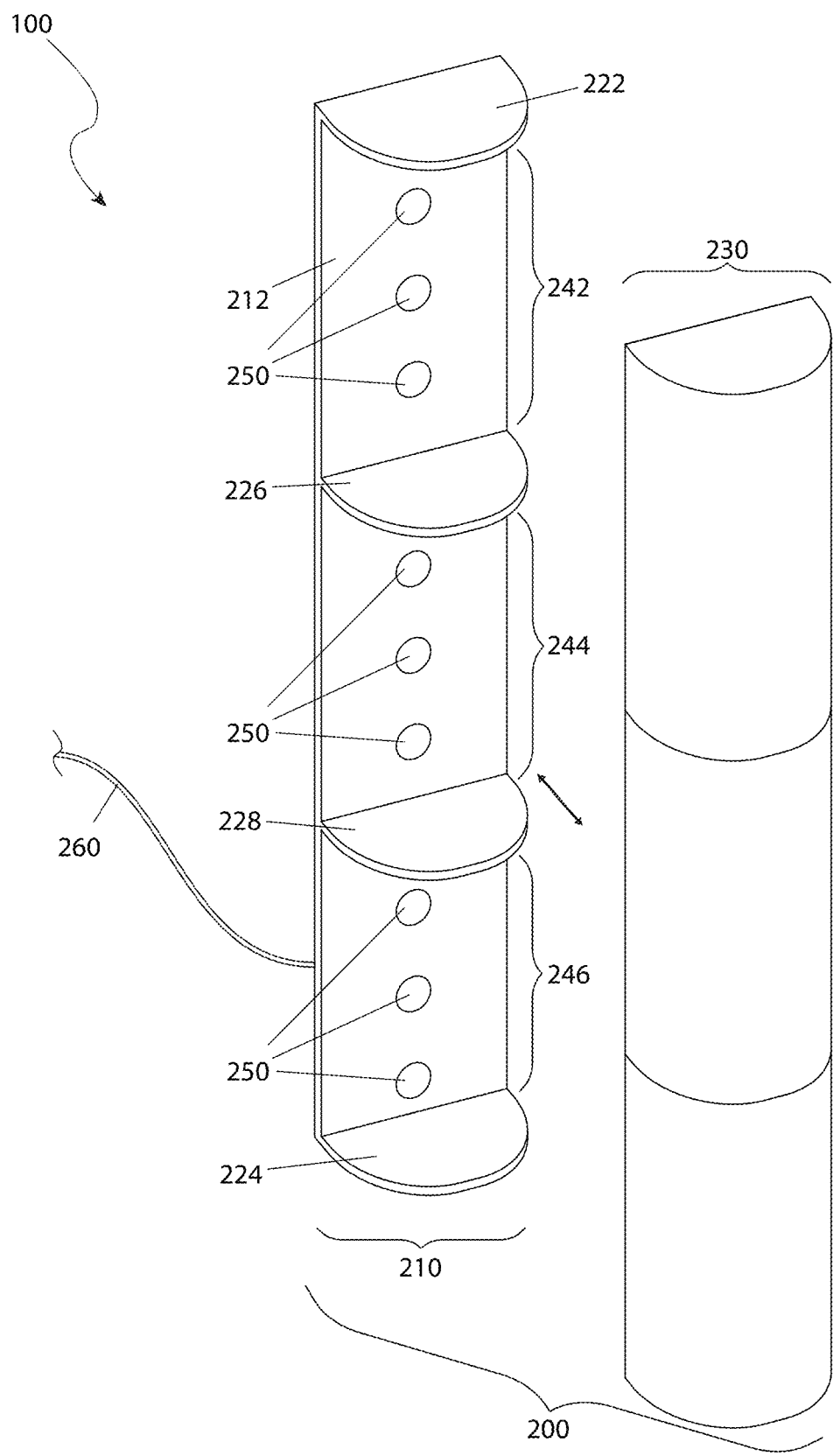

DESCRIPTIVE KEY 100 big rig light
200 fairing panel light
210 housing
212 mounting plate
222 top end plate
224 bottom end plate
226 upper divider
228 lower divider
230 lens 242 top light segment
244 center light segment
246 bottom light segment
250 light source
260 wiring harness
900 big rig truck
910 cab
930 fairing panel
932 rear edge
940 left fairing panel

DESCRIPTION OF THE INVENTION

The present invention is directed to a big rig light (herein described as the "invention") 100. Invention 100 may be a fairing panel light 200 comprising a housing 210 and one (1) or more lens 230. The fairing panel light 200 may be coupled to the rear edge 932 of a fairing panel 930 on a cab 910 of a big rig truck 900. The invention 100 may improve the visibility of the cab 910 to other vehicles, especially when turning or backing. The invention 100 may be adapted to better illuminate surroundings for the driver of the cab 910 when backing. The fairing panel light 200 may be formed to look factory-fitted. The fairing panel light 200 may be coupled to a left fairing panel 940, a right fairing panel, or both. As non-limiting examples, the big rig truck 900 may also be referred to as a tractor-trailer, a semi-trailer truck, a semi, or an eighteen-wheeler.

As a non-limiting example, the fairing panel 930 may be coupled to the bottom of sides of the cab 910 in order to improve aerodynamics of the cab 910. The fairing panel 930 may streamline steps, fuel tanks, battery boxes, and other equipment and may prevent air from directly impacting the rear tires of the cab 910. The fairing panel 930 may also be referred to as a skirt.

In some embodiments, the fairing panel light 200 may fit either the left fairing panel 940 or the right fairing panel directly or after inverting the fairing panel light 200. In some embodiments, the fairing panel light 200 may be contoured to fit only the left fairing panel 940 or only the right fairing panel. As non-limiting examples, a left fairing panel light may fit the left fairing panel 940 and a right fairing panel light may fit the right fairing panel. The left fairing panel light and the right fairing panel light may be sold individually or as a set of fairing panel lights.

The housing 210 may be coupled to the rear edge 932 of an individual fairing panel. The housing 210 may be held in place by mounting hardware. As non-limiting examples, the mounting hardware may comprise screws, bolts, nuts, washers, rivets, clips, hooks, or any combination thereof. The housing 210 may comprise a mounting plate 212 and a plurality of internal lens supports. The mounting plate 212 may be a vertically-oriented plate that is held adjacent to the rear edge 932 of the fairing panel 930. A plurality of light sources 250 may be coupled to the mounting plate 212 such that the plurality of light sources 250 face away from the fairing panel 930.

The plurality of internal lens supports may hold one (1) or more lens 230 in place to cover the plurality of light sources 250. The plurality of internal lens supports may be contoured to match the inside of any lens 230. The lens 230 may cover the plurality of internal lens supports when any lenses 230 are installed.

The plurality of internal lens supports may define a plurality of segments within the fairing panel light 200. Illumination of the plurality of segments may be controlled independently. In a preferred embodiment, the fairing panel light 200 may comprise three (3) segments.

The plurality of internal lens supports may comprise a top end plate 222, a bottom end plate 224, an upper divider 226, and a lower divider 228. The top end plate 222 may project perpendicularly from the top of the mounting plate 212. The bottom end plate 224 may project perpendicularly from the bottom of the mounting plate 212. The upper divider 226 may project perpendicularly from the mounting plate 212 between the top end plate 222 and the bottom end plate 224. The lower divider 228 may project perpendicularly from the mounting plate 212 between the upper divider 226 and the bottom end plate 224.

The top end plate 222 and the upper divider 226 may define a top light segment 242. The top light segment 242 may be illuminated when the plurality of light sources 250 on the mounting plate 212 located between the top end plate 222 and the upper divider 226 are energized. The upper divider 226 and the lower divider 228 may define a center light segment 244. The center light segment 244 may be illuminated when the plurality of light sources 250 on the mounting plate 212 located between the upper divider 226 and the lower divider 228 are energized. The lower divider 228 and the bottom end plate 224 may define a bottom light segment 246. The bottom light segment 246 may be illuminated when the plurality of light sources 250 on the mounting plate 212 located between the lower divider 228 and the bottom end plate 224 are energized.

The lens 230 may cover the housing 210 and the plurality of light sources 250. As non-limiting examples, the lens 230 may be held in place on the housing 210 by one (1) or more snap-fits, mounting hardware, or both. As non-limiting examples, the lens 230 may be clear, opaque, or both.

In some embodiments, the lens 230 may be a single contiguous lens that covers all of the plurality of segments. Alternatively, the lens 230 may comprise a plurality of lens segments where one (1) lens segment covers an individual segment of the fairing panel light 200.

The individual segments selected from the plurality of segments may be individually illuminated. The brightness of the individual segments may be controlled by illuminating more or less of the plurality of light sources 250 within the individual segment. The individual segments may perform the function of a taillight, a turn signal, a brake light, a backup light, or any combination thereof.

The individual segment may perform the function of the taillight by being illuminated at night to mark the rear of the cab 910. The taillight may be illuminated by red light having a first intensity which may be seen at least 500 ft away from the taillight. The individual segment may perform the function of the turn signal by being illuminated periodically on the side of the cab 910 corresponding to the direction of an intended turn. The turn signal may be illuminated by red light having a second intensity where the second intensity is brighter than the first intensity. The individual segment may perform the function of the brake light by being illuminated on both sides of the cab 910. The brake light may be illuminated by red light having the second intensity where the second intensity is brighter than the first intensity. The individual segment may perform the function of the backup light by being illuminated on both sides of the cab 910. The backup light may be illuminated by white light having at least the second intensity where the second intensity is brighter than the first intensity.

The plurality of light sources 250 may be energized within the individual segments responsive to being activated by controls within the cab 910. In a preferred embodiment, the plurality of light sources 250 in the top light segment 242 may be illuminated to perform the taillight function responsive to the driver turning on the headlights; the plurality of light sources 250 in the top light segment 242 may illuminate to perform the turn signal function responsive to the driver activating a turn signal lever to signal a turn, the center light segment 244 may illuminate to perform the brake light function responsive to the driver pressing the brake pedal, and the bottom light segment 246 may illuminate to perform the backup light responsive to the driver shifting to reverse. In a preferred embodiment, the plurality of light sources 250 may be a plurality of light-emitting diodes (LED's). The plurality of light sources 250 may receive power and control signals via a wiring harness 260 that may be electrically coupled to the electrical system of the cab 910.

In use, the fairing panel light 200 may be coupled to the cab 910 of a big rig truck 900 on the left fairing panel 940, the right fairing panel, or both. The fairing panel light 200 may be coupled to an individual fairing panel selected from the individual fairing panel by mounting the housing 210 onto the rear edge 932 of the individual fairing panel using snap-fits, mounting hardware, or both. The wiring harness 260 from the fairing panel light 200 may be electrically coupled to the electrical system of the cab 910. The lens 230 may be coupled to the housing 210 to complete installation of the fairing panel light 200. The top light segment 242, the center light segment 244, the bottom light segment 246, or any combination thereof may be illuminated and extinguished responsive to activation of controls within the cab 910. The plurality of lens segments, individually or in groups, may be illuminated to display a signal or to illuminate an area.

As non-limiting examples, one (1) or more of the individual segments may be illuminated with a continuous red light at the first intensity to display a taillight function that calls attention to the cab 910 at night. One (1) or more of the individual segments may be illuminated periodically with red light at the second intensity to blink a turn signal function that warns of a turn. One (1) or more of the individual segments may be illuminated with continuous red light at the second intensity to display a brake light function that warns of a stop or reduction in speed. One (1) or more of the individual segments may be illuminated with continuous white light that is at least as bright as the second intensity to display a backup light function that illuminates an area located behind the fairing panel light 200.

In one embodiment, the invention consists of every element described in this specification. Specifically, the big rig light 100 consists of a fairing panel light 200 comprising a housing 210 and one or more lenses 230. The housing 210 consists of a mounting plate 212, a plurality of internal lens supports, including a top end plate 222, a bottom end plate 224, an upper divider 226, and a lower divider 228, which collectively define a top light segment 242, a center light segment 244, and a bottom light segment 246. The big rig light 100 further consists of a plurality of light sources 250 positioned within the defined segments and controlled by a wiring harness 260. Each light source 250 is covered by the lens 230, which may consist of either a single contiguous lens or a plurality of lens segments. The invention includes mounting hardware for coupling the housing 210 to the rear edge 932 of a fairing panel 930 located on the left fairing panel 940 or a right fairing panel of a big rig truck 900. The invention is configured to provide taillight, turn signal, brake light, and backup light functions, each responsive to controls within the cab 910 of the big rig truck 900. This embodiment consists of the stated elements in their entirety, ensuring the invention fulfills its intended purpose without omission or addition of any other features.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A big rig light for a truck, comprising:
    a fairing panel light configured to be coupled to a rear edge of a fairing panel on a cab of the truck;
    a housing including:
        a mounting plate configured to be secured adjacent to the rear edge of the fairing panel using mounting hardware;
        plurality of internal lens supports comprising:
            a top end plate projecting perpendicularly from a top portion of the mounting plate;
            a bottom end plate projecting perpendicularly from a bottom portion of the mounting plate;
            an upper divider projecting perpendicularly from the mounting plate between the top end plate and the bottom end plate; and,
            a lower divider projecting perpendicularly from the mounting plate between the upper divider and the bottom end plate;
        a plurality of light sources coupled to the mounting plate, wherein the plurality of light sources are configured to provide illumination;
        a lens configured to cover the housing and the plurality of light sources; and,
        a wiring harness electrically coupled to the plurality of light sources and configured to connect to the truck's electrical system to control illumination of the plurality of light sources.

2. The big rig light of claim 1, wherein the housing defines a plurality of light segments, including:
    a top light segment defined by the top end plate and the upper divider;
    a center light segment defined by the upper divider and the lower divider; and,
    a bottom light segment defined by the lower divider and the bottom end plate.

3. The big rig light of claim 2, wherein each of the plurality of light segments includes a portion of the plurality of light sources configured to be independently illuminated.

4. The big rig light of claim 3, wherein the lens comprises:
    a single contiguous lens covering all of the plurality of light segments; or
    a plurality of lens segments, each of the plurality of lens segments configured to cover an individual light segment.

5. The big rig light of claim 1, wherein the mounting hardware comprises at least one of screws, bolts, nuts, washers, rivets, clips, or hooks.

6. The big rig light of claim 1, wherein the plurality of light sources are light-emitting diodes (LEDs).

7. The big rig light of claim 1, wherein the plurality of light sources are configured to provide:
   a taillight function by emitting red light at a first intensity;
   a turn signal function by emitting red light at a second intensity, the second intensity being greater than the first intensity;
   a brake light function by emitting continuous red light at the second intensity; and,
   a backup light function by emitting white light at the second intensity.

8. The big rig light of claim 7, wherein the plurality of light sources are activated by controls located within the cab of the truck.

9. The big rig light of claim 1, wherein the fairing panel light is configured to be mounted on at least one of:
   a left fairing panel of the cab; or
   a right fairing panel of the cab.

10. The big rig light of claim 9, wherein the fairing panel light is symmetrical and may be inverted to fit either the left fairing panel or the right fairing panel.

11. The big rig light of claim 1, wherein the fairing panel improves the aerodynamics of the truck by streamlining equipment and preventing direct air impact on rear tires of the cab.

12. The big rig light of claim 1, wherein the wiring harness is configured to transmit power and control signals to the plurality of light sources.

13. The big rig light of claim 1, wherein the housing is configured to provide a factory-fitted appearance when installed on the truck.

* * * * *